United States Patent [19]

Jha et al.

[11] Patent Number: 4,732,888
[45] Date of Patent: Mar. 22, 1988

[54] DURABLE ZINC FERRITE SORBENT PELLETS FOR HOT COAL GAS DESULFURIZATION

[75] Inventors: Mahesh C. Jha, Arvada; Antonio E. Blandon, Thornton, both of Colo.; Malcolm T. Hepworth, Edina, Minn.

[73] Assignee: AMAX Inc., Greenwich, Conn.

[21] Appl. No.: 863,287

[22] Filed: May 15, 1986

[51] Int. Cl.⁴ ............................................. B01J 20/02
[52] U.S. Cl. .................................. 502/406; 502/400; 502/414; 502/514; 502/524; 423/230; 423/231; 423/594; 423/622
[58] Field of Search ............... 502/400, 406, 411, 412, 502/517, 415, 307, 329, 338, 342, 343, 344, 321, 324, 524, 414; 423/594, 596, 622, 220, 230, 231, 622

[56] References Cited

U.S. PATENT DOCUMENTS

| | | | |
|---|---|---|---|
| 2,292,632 | 8/1942 | Greger | 502/406 |
| 3,441,370 | 4/1969 | Gutmann et al. | 423/230 |
| 3,492,083 | 1/1970 | Lowicki et al. | 502/56 |
| 3,579,293 | 5/1971 | Shultz et al. | 423/231 |
| 3,684,447 | 8/1972 | Johnston et al. | 423/594 |
| 3,778,374 | 12/1973 | Schichijo et al. | 423/594 |
| 3,832,455 | 8/1974 | Smith et al. | 423/594 |
| 4,083,884 | 4/1978 | Purdy | 502/329 |
| 4,088,736 | 5/1978 | Courty et al. | 423/574 |
| 4,171,285 | 10/1979 | Mulaskey | 502/400 |
| 4,299,802 | 11/1981 | Tellis | 502/400 |
| 4,311,680 | 1/1982 | Frech et al. | 423/231 |
| 4,323,544 | 4/1982 | Magder | 502/517 |
| 4,366,131 | 12/1982 | Fox | 423/231 |
| 4,443,264 | 4/1984 | Hund et al. | 423/594 |
| 4,472,369 | 9/1984 | Kambe et al. | 423/594 |
| 4,533,529 | 8/1985 | Lee | 423/230 |

FOREIGN PATENT DOCUMENTS 0159056 10/1985 European Pat. Off. ............ 502/406

Primary Examiner—Helen M. S. Sneed
Assistant Examiner—Anthony McFarlane
Attorney, Agent, or Firm—Michael A. Ciomek; Eugene J. Kalil

[57] ABSTRACT

Durable, porous sulfur sorbents useful in removing hydrogen sulfide from hot coal gas are prepared by water pelletizing a mixture of fine zinc oxide and fine iron oxide with inorganic and organic binders and small amounts of activators such as sodium carbonate and molybdenite; the pellets are dried and then indurated at a high temperature, e.g., 1800° C., for a time sufficient to produce crush-resistant pellets.

9 Claims, 1 Drawing Figure

LEGEND
F - SPLIT FURNACE
H - PREHEATERS
G.C.- GAS CHROMATOGRAPH LINES
R - REACTOR
M - MIXING MANIFOLD
T.C.- THERMOCOUPLE STATIONS

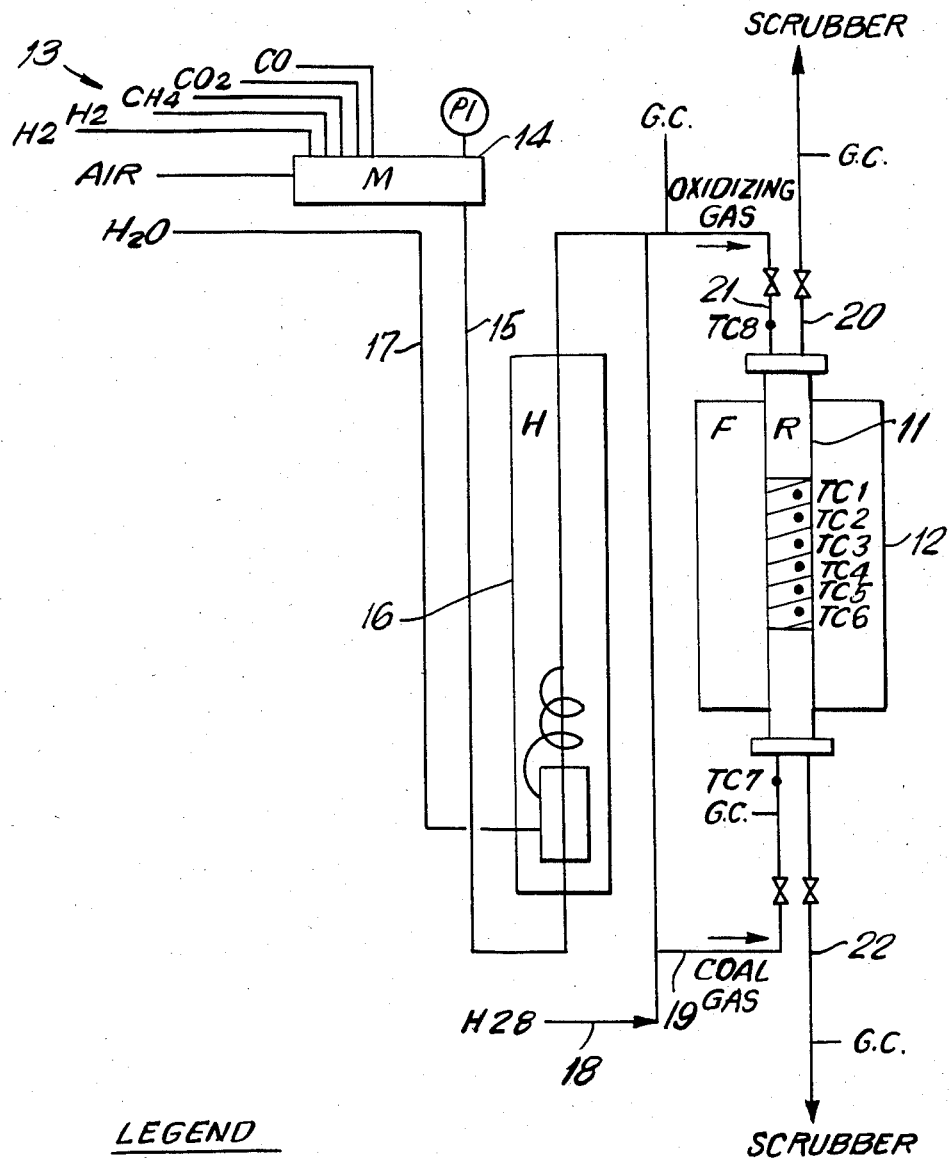

DURABLE ZINC FERRITE SORBENT PELLETS FOR HOT COAL GAS DESULFURIZATION

A process has been developed to produce strong and reactive zinc ferrite sorbent pellets which are capable of efficiently removing hydrogen sulfide from a hot gaseous mixture, are easily regenerated by air oxidation while permitting recovery of sulfur in a useful form, and, above all, are able to maintain their physical integrity and chemical reactivity after repeated use in a large number of sulfidation and regeneration cycles.

BACKGROUND OF THE INVENTION AND THE PRIOR ART

Coal represents our largest resource of fossil energy. The efficiency of converting this stored chemical energy to commonly used electrical energy can be significantly improved if the coal is first gasified and the resulting hot coal gas further oxidized in either a fuel cell or in a heat engine. This approach is presently being pursued vigorously by the United States Department of Energy.

One of the major problems encountered in this approach is the presence of sulfur in most of the coals, which gets converted to hydrogen sulfide during gasification. The concentration of this extremely toxic hydrogen sulfide gas in the hot coal gas at the several thousand ppm or higher level is unacceptable from the environmental point of view. Such high concentrations of hydrogen sulfide gas is also undesirable from the process economics point of view because the gas is corrosive to equipment and instruments and adversely affects the performance of molten carbonate fuel cell. It is projected that for such applications, the hydrogen sulfide concentration level should be on the order of a few ppm or less.

A similar situation is encountered in the steel industry where coal is converted to coke, which is then used in the making of iron. Hydrogen sulfide formed during the coking of sulfur-bearing coal has to be removed from the hot coke oven or producer gas before it can be used further.

The conventional technology of scrubbing the gas for removal of hydrogen sulfide is not practical in these situations because the scrubbing processes operate at room temperature or relatively low temperature and, therefore, impose a severe thermal penalty. Thus for the integrated gasification combined cycle approach, the desulfurization has to be performed at high temperature and, in many cases, at high pressure. To improve the process economics further, it would be desirable to have an easily regenerable sorbent which would not only decrease the cost of sorbent but also the costs associated with frequent loading and unloading of the reactors with sorbent and the costs associated with disposal of the used sorbent. Regeneration, of course, means putting the sorbent back into the oxide form, and this entails oxidation of sulfur present as sulfide. It would be desirable if this sulfur is recovered in a commercially marketable form such as elemental sulfur, liquid sulfur dioxide, or sulfuric acid. This would be possible if a concentrated sulfur dioxide stream is generated during the regeneration cycle.

The high temperature desulfurization can be conveniently accomplished by using solid sorbents such as oxides of those metals that form stable sulfides. Calcium oxide in the form of calcined or half-calcined limestone or dolomite can be an obvious choice. However, in this case it is very difficult to remove the sulfur from the sorbent and convert it back to the oxide form for repeated use because of the stability of calcium sulfate formed during oxidation of the calcium sulfide. Another problem is encountered if one decides to throw away the calcium sulfide rather than try to regenerate it at considerable expense. This problem is related to generation of hydrogen sulfide gas when calcium sulfide is exposed to humid environment.

To overcome this problem, the Morgantown Energy Research Center of the U.S. Department of Interior, now known as Morgantown Energy Technology Center of the U.S. Department of Energy (METC), developed some iron oxide based sorbents for high temperature desulfurization, as detailed in U.S. Pat. No. 3,579,293 granted to Shultz, et al. Since iron sulfate decomposes to iron oxide at moderately high temperatures, the sorbent is regenerable. The iron oxide was mixed with fly-ash and bentonite to impart strength to the extrudates.

During mid 1970's, the Morgantown center extended the applicability of iron oxide based sorbents to removal of hydrogen sulfide from hot, low-Btu gas. The hydrogen sulfide concentration in the feed gas was about 0.5 percent, and about 90 to 94 percent removal was accomplished, resulting in about 300 to 500 ppm hydrogen sulfide in the exit gas stream. The absorption capacity of the sorbent was about 8 percent sulfur by weight.

The removal of hydrogen sulfide to the 300 to 500 ppm level is not adequate for most of the energy conversion options currently under investigation by the Department of Energy and other companies interested in producing and utilizing hot coal gas. In fact, the tolerance for a molten carbonate fuel cell (MCFC) may be only a few ppm, and to meet this requirement, METC tested several sorbents containing zinc oxide by itself or in combination with iron oxide. It was concluded that either zinc oxide or zinc ferrite can be used to desulfurize hot coal gas to a few ppm $H_2S$ level. Such low hydrogen sulfide concentration levels are not attained with other metal oxides such as manganese oxide recommended in U.S. Pat. No. 4,180,549, granted to Olsson, et al.

The choice of zinc oxide was based on the thermodynamic considerations that indicated very low concentration levels of $H_2S$ in equilibrium with ZnO, ZnS, and $H_2O$ vapor. However, during the regeneration cycle, zinc sulfate is somewhat more stable than iron sulfate at the same temperature. Thus, the zinc ferrite sorbent, which represents a stoichiometric combination of $Fe_2O_3$ and ZnO, offers the best properties of both oxides and was selected for further development work at METC.

During further testing of zinc oxide and zinc ferrite sorbents at METC, it was observed that the sulfidation capacity of the sorbents dropped significantly during the second, third, and subsequent cycles of testing.

Such quick deterioration in the performance of the sorbent cannot be accepted in commercial applications where the plant has to perform on design capacity cycle after cycle, day after day for long periods. It is estimated that this period should be about one year for an economically attractive operation. Besides the loss in sulfur sorption capacity, the presently available sorbent also undergoes physical disintegration. Such disintegration would not only cause deterioration in the performance of the reactor but also would lead to loss of sorbent fines from the bed, which in turn would require another device to separate the fines from the gas before it could be used in heat engines or fuel cells. Another shortcoming of some of the state-of-the-art sorbents is that they are prepared with a large amount of inert material which occupies space in the reactor but does not contribute to the desulfurization process. This inert material has been used or recommended either in the form of support material, as described in U.S. Pat. No. 4,089,809 granted to Farrior, Jr., or in the form of inert filler, as described in U.S. Pat. No. 4,088,736 granted to Courty, et al.

The preparation of sorbents using complex procedures of supporting them on filler base, or forming extrudates, or subjecting the extrudates to a variety of impregnation and thermal treatments makes the sorbent production process expensive. The cost would be further increased when a number of reagents are required or the reagents are not commercially available common chemicals.

Other known references to the subject matter of the invention include the following:

1. E. C. Oldaker, A. M. Poston, Jr., and W. L. Farrior, Jr., "Removal of Hydrogen Sulfide from Hot Low-Btu Gas with Iron Oxide-Fly Ash Sorbents", Report MERC/TPR-75/1, Morgantown Energy Research Center, Morgantown, W. Va., February 1975.
2. T. Grindley and G. Steinfeld, "Development and Testing of Regenerable Hot Coal Gas Desulfurization Sorbents", Report DOE/MC/16545-1125(DE82011114), Morgantown Energy Technology Center, Morgantown, W. Va., October 1981.
3. T. Grindley and G. Steinfeld, "Zinc Ferrite Hydrogen Sulfide Absorbent" in Third Annual Contaminant Control in Hot Coal Derived Gas Streams Contractors' Meeting Proceedings, K. E. Markel (Editor), DOE/METC/84-6(DE84000216), December 1983, pp. 145–171.
4. T. Grindley and G. Steinfeld, "Testing of Zinc Ferrite Hydrogen Sulfide Absorbent in a Coal Gasifier Sidestream" in Proceedings of the Fourth Annual Contractors' Meeting on Contaminant Control in Hot Coal-Derived Gas Streams, K. E. Markel (Editor), DOE/METC-85/3(DE85001954), December 1984, pp. 314–336.
5. P. R. Westmoreland, J. B. Gibson, and D. P. Harrison, "Comparative Kinetics of High-Temperature Reaction Between $H_2S$ and Selected Metal Oxides" *Environmental Science and Technology*, Volume 11, No. 5, May 1977, pp. 488–491.
6. R. A. Swalin, *Thermodynamics of Solids*, John Wiley and Sons, Inc., New York, pp. 306–312.
7. Y. K. Rao, "Catalysts in Extractive Metallurgy", *Journal of Metals*, July 1983, pp. 46–50.

OBJECTIVES OF THE INVENTION

The prime objective of this invention is to provide a process for producing durable zinc ferrite-based sorbents for hot coal gas desulfurization. The durability is defined as the ability of the sorbent to maintain its desired physical and chemical characteristics in long-term cyclic sulfidation and regeneration tests simulating a commercial high-temperature desulfurization operation. The desired physical characteristics include high crush strength, resistance to attritioning or physical disintegration, and high porosity and/or surface area. The desired chemical characteristics are high sulfidation and regeneration efficiencies.

A second objective is to provide a process to produce these sorbents of a composition that would permit high sulfur sorption capacity during the sulfidation cycle and minimize the sulfate formation during the regeneration cycle.

A third objective is to provide a process to produce these sorbents in a form that permits high sulfidation efficiency in terms of good solid/gas contact in the reactor, easy mechanical handling of the sorbent for filling and discharging the reactor or transferring the sorbents to another reactor.

Last but not least, a fourth objective is to provide a process to produce the above described sorbent, which is simple and relatively inexpensive. This implies utilizing the commercially available reagents and equipment and keeping their number at a minimum.

These and other objectives will more clearly appear when taken in conjunction with the following disclosure and appended claims.

SUMMARY OF THE INVENTION

Very fine zinc and iron oxide powders are mixed thoroughly with organic and inorganic binders and modifiers in a blending unit such as a mix-muller, double-cone mixer or ribbon blender. The mixed powder is then fed to a pelletizer, along with a fine spray of water to form spherical pellets. These pellets are dried to impart green strength for further handling. The dried pellets are then indurated at high temperature to obtain the desired combination of physical properties such as crush strength, surface area, and porosity.

The basic formulation, a combination of zinc and iron oxide of very fine particle size, provides excellent sulfidation and regeneration characteristics. The optional presence of modifiers such as manganese oxide present in the iron oxide or molybdenite and sodium carbonate added separately further helps in improving the chemistry.

The spherical shape of the pellets and the high crush strength imparted to them by the presence of inorganic binders such as bentonite and kaolin results in desirable handling and packing characteristics.

The presence of an organic binder such as starch results in high surface area and porosity as this material burns away during the induration process. The presence of inorganic binders such as bentonite and kaolin, on the other hand, results in strong permanent bridging action between zinc ferrite particles. A combination of two kinds of binders thus produces strong and porous pellets that maintain their integrity and internal structure after repeated use in sulfidation and regeneration cycles.

The process uses commercially available common reagents such as zinc oxide, iron oxide, bentonite, kaolin, starch, molybdenite and sodium carbonate. The pelletizing operation requires simple and cheap equipment such as a mix-muller or ribbon blender, a disc or drum pelletizer, a drying oven, and a heat treating furnace. This combination offers cheap reagents and simple operation.

DESCRIPTION OF THE DRAWING

The drawing illustrates schematically the experimental setup used for testing and comparing sorbents.

DETAILED DESCRIPTION OF THE INVENTION

Sulfur sorbents contemplated in accordance with the invention consist essentially of zinc ferrite. Desirably, the sorbents are produced in pelletized form and are indurated at high temperatures, e.g., about 1600° to 2000° F. for about 0.5 hours to about 4 hours, e.g. three hours. The pellets are characterized by a surface area of about 0.5 to about 5 m.$^2$/gram.

In the pelletizer a small amount up to about 15%, by weight, e.g., about 7% by weight, of inorganic binders such as bentonite, kaolin, portland cement, or like and a small amount up to about 5% by weight, e.g., about 2% by weight of an organic binder such as starch, methyl cellulose, molasses and the like are employed to contribute strength and porosity to the indurated pellets. A small amount up to about 5% by weight, of manganese oxide may be added or may be present as an ingredient in the zinc oxide or iron oxide employed. A small amount, about 0.2% by weight, of an alkali metal compound such as sodium carbonate, potassium carbonate, and a catalyst such as molybdenite may be employed as an activator.

In terms of the binders, the main function of an organic binder is to help in agglomerating the fines into a desired shape, and then, since they burn away during the induration process, they leave behind a very porous structure which is desirable for fast kinetics. An inorganic binder, on the other hand, chemically interacts with the zinc ferrite grains providing a cementing action which creates a durable network structure and imparts strength to the agglomerate. In simplistic terms, the pores created by burning away of an organic binder are like a network of canals that allow easy and quick flow of the reactant and product gases to a large reacting surface area. The joints provided by the inorganic binder are like bridges that prevent collapse of pores and maintain physical integrity. The physical integrity can be expressed in terms of the crushing strength which ranges between 5 and 20 dead weight load (DWL).

The drawing illustrates schematically apparatus constructed to test known sorbents and compare results thereon to those obtained with sorbents produced in accordance with the invention.

Reactor 11 having an inside diameter of 2 inches and a heigth of 30 inches was used. The reactor 11 was filled with test sorbents to a height of about 18 inches, giving a fixed-bed volume of about 0.93 liters. The weight of the sorbent in the column varied from 900 to 1500 grams depending upon the physical and chemical characteristics of the sorbent. Reactor 11 was enclosed in a split-tube furnace 12. Thermocouples, designated TC were used to measure temperature at different locations throughout the sorbent bed. Bed temperature was maintained at around 650° C. since it was known from the literature that at lower temperatures, sulfidation kinetics were slow, whereas higher temperatures brought increasing risk of migration and loss of zinc. The test gas had the composition set forth in the following Table 1:

TABLE 1

| Gas | Volume Percent |
| --- | --- |
| Hydrogen | 19.9 |
| Nitrogen | 27.3 |
| Carbon Monoxide | 11.7 |
| Carbon Dioxide | 9.8 |
| Methane | 2.9 |
| Water Vapor | 27.4 |
| Hydrogen Sulfide | 1.0 |

The gases were led from cylinders 13 to manifold 14 with gas composition being controlled by monitoring the individual gas flowrates. The mixed gases were led through conduit 15 to gas preheater 16 where the mixture was preheated to 550° C. Water from a metering pump was introduced into preheater 16 through conduit 17. Hydrogen sulfide was added to the preheated gas mixture by conduit 18.

The mixed gases were then led to the bottom of reactor 11 through conduit 19. Exit gas was led from reactor 11 through conduit 20 and was analyzed for H$_2$S using a gas chromatograph. Appearance of about 200 ppm H$_2$S in the exit gas was taken as the end point for stopping the sulfidation cycle and the amount of sulfur absorbed at that point was taken as the sulfur sorption capacity, grams S per 100 grams sorbent. The reactor was then purged with nitrogen and the regeneration cycle was started using a preheated mixture of air and steam fed to the reactor through conduit 21 so that regeneration proceeded from the top down.

Regeneration with the oxidizing gas mixture oxidizes the zinc and iron sulfides to the respective metal oxides and is strongly exothermic. Accordingly, the bed temperature during regeneration is controlled to be below 850° C., e.g., 700° to 800° C. by proportioning the steam:air mixture to e.g., about 75% steam, by volume. During regeneration, SO$_2$ content of the exit gas in exhaust conduit 22 was monitored and regeneration was stopped when the SO$_2$ content dropped to 0.5%. Bed temperature during regeneration is controlled so that undesirable effects attributable to excessive temperature, such as sintering of the sorbent material which would lead to reduction in porosity and surface area and possible channeling, are avoided.

On completion of regeneration, another sulfidation cycle is then started. Operation of alternate sulfidation and regeneration cycles was continued until the sorbent performance, as measured by the time to breakthrough and calculated as weight percent sulfur loading at breakthrough, deteriorated considerably in comparison to the performance in the first few cycles. By definition, a durable sorbent is one that maintains its performance for many cycles.

At the end of each multi-cycle test series, the sorbent pellets were removed from the reactor and analyzed for their physical and chemical characteristics. The physical characteristics generally measured were the size of the particles and the amount of fines (minus 8-mesh material) generated during testing and the specific surface area. The chemical characteristics included the zinc, iron, and sulfur contents.

Besides the durability, the sorbent pellets should load a high amount of sulfur on a weight percent basis to keep the cost of the desulfurization process low.

The sulfur loading at breakthrough in the reactor gives a good idea of the relative performance of various types of sorbents. To project what level of sulfur loading can be obtained in a commercial reactor, the final sulfidation cycle in some of the tests was continued beyond the breakthrough point to near the saturation point. At this point, the $H_2S$ concentration in the exit gas changed very slowly and approached the $H_2S$ concentration in the inlet gas on a dry basis (about 1.3 percent).

Four different sorbents described in Table 2 were tested with the results summarized in Table 3:

TABLE 2

| Sorbent A | Commercially available zinc ferrite sorbent extrudates prepared by United Catalyst Inc. (Sample L-1504), used in past METC work. |
|---|---|
| Sorbent B | Prepared by mixing chemical grade ZnO and mineral grade iron oxide in 1:1 mol ratio with 10 wt. % bentonite and 25 wt. % water, extruding at 3/16 inch diameter, dried, then indurated at 1600° F. for 3 hours. The extrudates had a crush strength of 29 pounds dead weight load (DWL) as compared to 16-pounds DWL for Sorbent A. |
| Sorbent C | Prepared as Sorbent B but using catalyst-grade iron oxide powder instead of mineral grade. Crush strength was 21-pounds DWL. |
| Sorbent D | Prepared by mixing in a mix-muller chemical grade ZnO with pigment-grade iron oxide in 1:1 mol ratio with 5 wt. % bentonite, 1.5% kaolin, 2% starch, 0.21 wt. % sodium carbonate and 0.2 wt. % molybdenite. The iron oxide itself contained about 6% $Al_2O_3$ and $SiO_2$, about 6% manganese oxide, balance $Fe_2O_3$. The mixture was pelletized with water on a disc pelletizer to give 3/16 inch diameter balls, air dried and indurated at 1800°–1900° F. for about 3 hours. |

TABLE 3

| Sorbent Designation: | A | B | C | D |
|---|---|---|---|---|
| Mass of Sorbent in 0.93 Liter of Bed; grams | 1330 | 1490 | 940 | 1294 |
| Number of Cycles Tested: | 30 | 92 | 34 | 43 |
| Average Sulfur Sorption Capacity, g/100 g Sorbent: | | | | |
| First 3 Cycles | 4.1 | 0.4 | 15.7 | 15.8 |
| Last 3 Cycles | 0.5 | 0.9 | 2.3 | 10.2 |
| To Saturation | | 4.3 | 25.9 | 24 |
| Specific Surface Area, $m^2/g$: | | | | |
| Initial | 2.6 | 1.6 | 6.2 | 0.64 |
| Final | 1.0 | 1.8 | 2.1 | 1.5 |
| Attritioning, Weight % Minus 8 Mesh in Final Bed: | 5–25 | 1.4 | 5.1 | 3.5 |

The results for Sorbent A, a known material included in the program to establish a base case showed a low initial sorption capacity which dropped to a very low level after 20 cycles of testing. Substantial disintegration was encountered indicating inadequate durability. An organic binder (methocel) is used in preparing the material.

The results for Sorbent B indicate the material had improved durability but low sulfur sorption capacity, both characteristics being attributed to the unreactive nature of mineral-grade iron oxide.

The results for Sorbent C indicate the catalyst-grade iron oxide was definitely more active but a durability problem was encountered and sulfur sorption capacity dropped almost an order of magnitude in 34 cycles.

Sorbent D which was produced using pigment grade iron oxide (Bayferrox brand produced by Mobay Chemical Corporation) which contained abut 6% by weight manganese oxide and using a combination of inorganic and organic binders with small amounts of activators, sodium carbonate and molybdenite provided superior performance. The sulfur sorption capacity was very high which resulted in cycle times three to five times longer than for the other sorbents. The sorbent pellets showed no sign of disintegration and the surface area remained the same after long-term testing. The 43 cycles of operation was equivalent to more than a hundred cycles of operation in terms of actual time at test conditions. Even better results up to 25% sulfur loading, were obtained when the sorbent was tested in a pressurized larger reactor.

Average particle size for mineral-grade iron oxide is about 7 microns, for catalyst-grade iron oxide is about 5 microns and for pigment-grade iron oxide used is about 0.3 microns. The zinc oxide used had a particle size of about 0.15 microns.

Spherical pellets are indicated to be preferable in that they are easier to handle during loading in and discharging from the reactor and are preferred in moving bed reactor designs wherein sorbent particles are moved from sulfidation to regeneration and back.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A durable, pelletized and indurated sorbent for removing hydrogen sulfide from hot coal gas which consists essentially of zinc ferrite, has a surface area of about 0.5 to about 5 $m^2$/gram, and is prepared by mixing fine iron oxide and fine zinc oxide, each having a particle size of less than about 1 micron in substantially equi-molar amounts with an inorganic binder in an amount greater than zero and up to about 15%, by weight, and an organic binder in an amount greater than zero and up to about 5%, by weight, up to about 5%, by weight, of manganese oxide, up to about 0.2%, by weight, of an alkali metal carbonate and up to about 0.2%, by weight, of molybdenite, said inorganic binder being capable of a strong bridging action between zinc ferrite particles during induration and said organic binder being capable of burning away during induration to form a porous structure, pelletizing the resulting mixture with water, drying the resulting pellets and indurating the dried pellets and a temperature of about 1600° F. to about 2000° F. to form strong, porous sorbent pellets having a crush strength of about 5 to about 20 lbs. Dead Weight Load.

2. The sorbent in accordance with claim 1 wherein said inorganic binder is selected from the group consisting of bentonite, kaolin and portland cement.

3. The sorbent in accordance with claim 1 wherein said organic binder is selected from the group consisting of starch, methyl cellulose and molasses.

4. The process for producing a durable sorbent for removing hydrogen sulfide from hot coal gas which comprises mixing fine iron oxide and fine zinc oxide, each having an average particle diameter of less than 1 micron in substantially equi-molar amounts with an inorganic binder in an amount greater than zero and up to about 15% by weight, an organic binder in an amount greater than zero and up to about 5% by weight and small amounts of up to about 0.5% by weight of a compound from the group consisting of an alkali metal basic compound and a molybdenite catalyst as activators, pelletizing the resulting mixture with water and indurating the resulting pellets at a temperature of about 1600° to about 2000° F. to produce durable pellets having a surface area of about 0.5 to about 5 m.$^2$/gram and crush strength of 5 to 20 lbs. Dead Weight Load.

5. The process in accordance with claim 4 wherein said inorganic binder is selected from the group consisting of bentonite, kaolin and portland cement.

6. The process in accordance with claim 4 wherein said organic binder is selected from the group consisting of starch, methyl cellulose and molasses.

7. The process in accordance with claim 4 wherein said alkali metal compund is sodium carbonate.

8. The process in accordance with claim 4 wherein said mixture contains up to about 0.2% by weight of molybdenite as a catalyst.

9. The process in accordance with claim 4 wherein said mixture contains up to about 5% by weight of manganese oxide.

* * * * *